US006997492B2

(12) United States Patent
Harris et al.

(10) Patent No.: US 6,997,492 B2
(45) Date of Patent: Feb. 14, 2006

(54) MANUAL CONTAINER LIFTER

(75) Inventors: Marlon D. Harris, Christiansburg, VA (US); Daniel Talbert, Jr., Pulaski, VA (US)

(73) Assignee: Alliant Techsystems Inc., Edina, MN (US)

(*) Notice: Subject to any disclaimer, the term of this patent is extended or adjusted under 35 U.S.C. 154(b) by 0 days.

(21) Appl. No.: 10/850,260

(22) Filed: May 20, 2004

(65) Prior Publication Data

US 2005/0258656 A1 Nov. 24, 2005

(51) Int. Cl.
 *B65G 7/12* (2006.01)
(52) U.S. Cl. ......................................... 294/16; 294/113
(58) Field of Classification Search .................. 294/16, 294/28, 31.2, 113, 114, 119.2, 164
See application file for complete search history.

(56) References Cited

U.S. PATENT DOCUMENTS

| 323,844 A | * | 8/1885 | Ayer | 294/114 |
| 1,987,493 A | * | 1/1935 | Richards | 294/16 |
| 2,749,173 A | * | 6/1956 | Peterson | 294/113 |
| 3,269,764 A | * | 8/1966 | Coleman | 294/16 |
| 3,960,398 A | * | 6/1976 | Johnson | 294/16 |
| 4,000,922 A | * | 1/1977 | Wade | 294/16 |
| 5,009,558 A | * | 4/1991 | Savedra, Jr. | 414/23 |
| 6,840,556 B1 | * | 1/2005 | Catlett | 294/16 |

* cited by examiner

Primary Examiner—Dean J. Kramer
(74) Attorney, Agent, or Firm—Nikolai & Mersereau, P:A:; C. G. Mersereau

(57) ABSTRACT

A low cost manual container lifting and placement unit operable by two people is disclosed which allows clamping, lifting and release of containers in a simple manner. The unit is made in two clamp jaw halves and each is connected to a rod that extends out to form handles on each side. The halves are connected by linking plates which allow rotation between the two halves causing the clamp halves to converge to grip a container of interest and diverge to release the container.

15 Claims, 2 Drawing Sheets

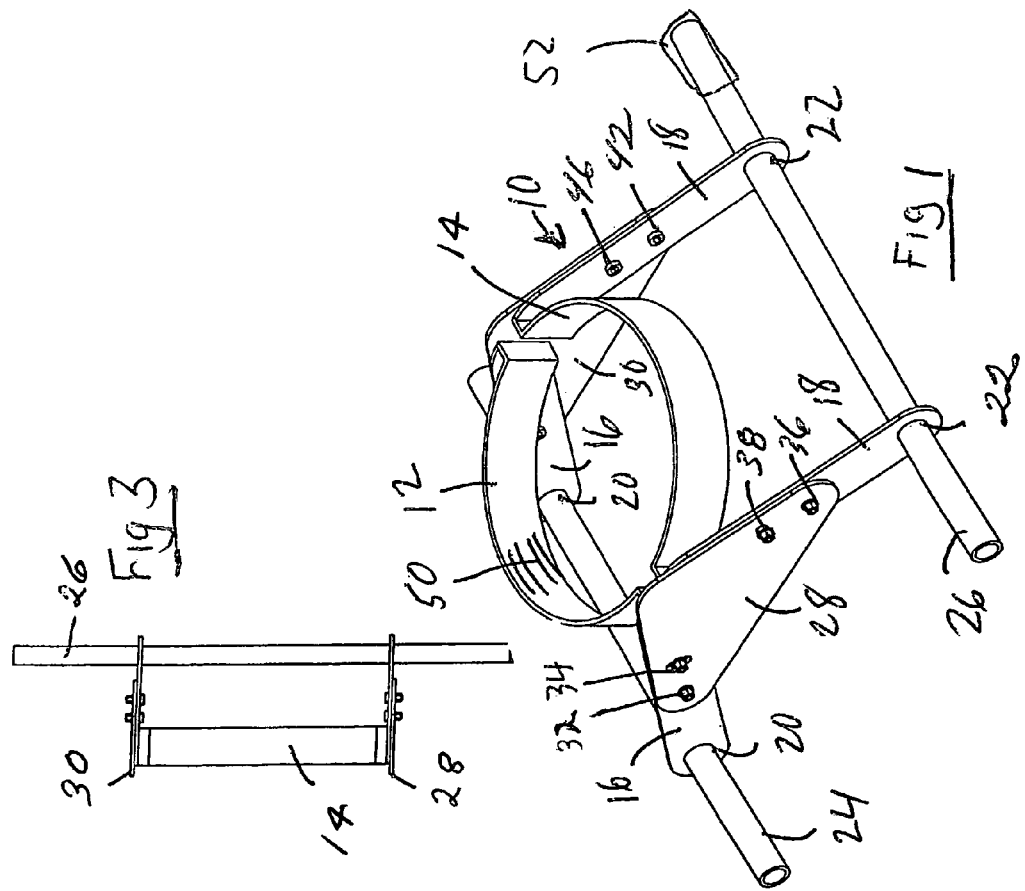
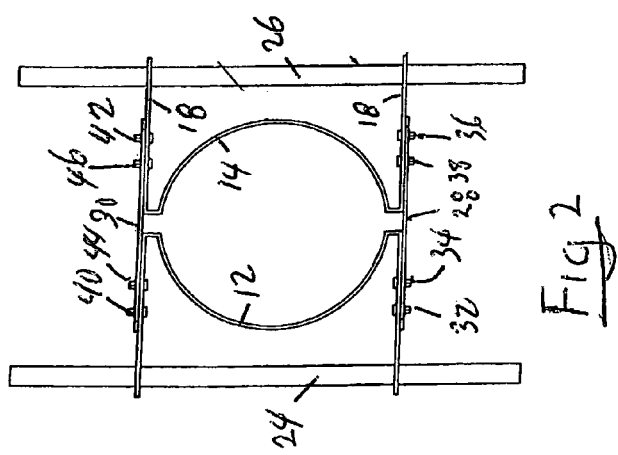
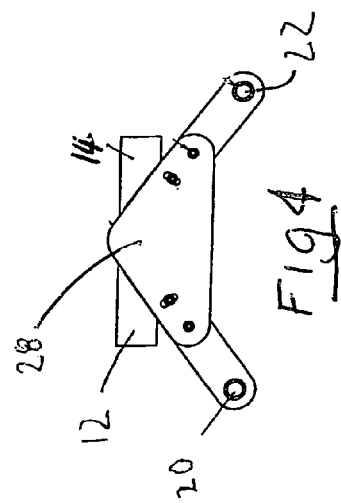

MANUAL CONTAINER LIFTER

BACKGROUND OF THE INVENTION

I. Field of the Invention

The present invention relates generally to the manual lifting and stacking of containers such as drums, barrels, canisters, or the like, particularly in close quarters where room does not permit manipulation by mechanized devices, but where the size and weight density are such that two persons are required to perform the lifting and placement operation and the operation is also logistically difficult, i.e., the two individuals must grapple with each container totally by hand. Problems are especially acute where storage capacity and transportation efficiencies require a plurality of layers of containers to be provided. The present invention provides a manual lifting device of relatively simple construction that is safely and easily operated by two persons. The lifting device has particular application in the manufacture and storage of munition propellant materials which are typically stored in cylindrical fiber drums which may need to be stacked and unstacked several times in close quarters.

II. Related Art

In the past, containers or canisters such as fiber drums containing processed propellant materials have been stored and moved in single-layer fashion manually loaded by two individuals who lift and place them on pallets. The pallets have been addressed by forklifts which stack them for storage or shipment. This method has several drawbacks, however, housing efficiency is reduced due to lost storage space, both on the pallets and in the storage buildings where much additional room has to be provided for the operation of the forklifts. Also, there are reduced efficiencies in the transportation of the materials because trucks transporting the product from the pack-out facilities have been limited to loading a single pallet layer in many cases because of lack of available room at destination buildings. Furthermore, additional manpower and time may be required if it is necessary to transport forklifts back and forth between storage buildings. Moreover, owing to the hazardous nature of the product being moved, the forklifts (or any other mechanized devices) used have to be rated to meet the hazards classification of the storage facility.

Known canister/barrel lifting devices also include manual jacks, hydraulic lifts and electric lifts and, while they can be used, they also introduce the same or similar types of inefficiencies and problems to the operation including space requirements and the need to meet hazardous classification requirements, particularly in the case of powered devices.

There has remained a need to provide a more efficient and user-friendly device to enable a pair of operators to lift and stack canisters or drums of the class in a limited space with a minimum of physical stress.

SUMMARY OF THE INVENTION

The present invention provides a lightweight, efficient and inexpensive two-person manual lifting device for accessing, capturing and lifting shaped containers such as cylindrical propellant drums. The manual lifting device of the invention features a pair of shaped converging/diverging opposed clamp jaw shapes having a width for capturing and releasing a container object of interest to be lifted. The device consists of two clamp halves held together by connecting plate members. Each clamp half includes a jaw shape configured to match and engage the shape of a partial perimeter of a container to be lifted, flanked by a pair of spaced jaw extensions or arm members which lead back from the jaw, are generally parallel and which diverge at an angle from the central jaw shape. The device also includes a pair of spaced generally parallel handle rods, each of which is attached through openings near the ends of the extensions or arms of one clamp jaw shape member. In this manner, a pair of opposed symmetrical clamp halves are assembled. The handle rods extend beyond the arms of the clamp jaw shape members forming handles designed to be grasped and lifted by two persons, one at each end of an assembled unit in the manner of a litter.

The clamp halves are assembled together using a pair of linking plates to connect each of the pairs of jaw extension arms of the two opposed jaw clamp shapes in the manner of an A-frame, spacing the jaw shapes and corresponding handles. The linking or connecting plates are fastened to the arms at two spaced points, an outer location near the free ends of the arms and an inner location near the clamp jaw shapes. At the inner location, the connecting plates are slotted so that the arms and clamp jaw shapes are free to pivot with respect to the connecting links on an amount corresponding to the length and shape of the slots, enabling the opposed clamp jaw shapes to converge and diverge a limited amount in a pivotal fashion about the outer connections.

In operation, the device is normally grasped by opposed facing persons, each grabbing two-end handles and easily slightly rotating the handles to cause the opposed clamp jaw shapes to open to maximum separation. The device can then be lifted over the lid of a container of interest and the handles rotated in the opposite direction to cause the jaw clamps to converge on the body of the container of interest. Once engaged, the weight of the body of the container of interest acts to hold the opposed clamp jaw shapes against the sides of the container and the operators merely need to lift the handles and place the container where desired. The handles can then be rotated in the opposite direction and the device easily removed from the container.

It will be apparent that lifting units of many sizes and shapes can be produced for use in moving containers of a corresponding variety of shapes and sizes. The lifting devices of the invention are preferably made of lightweight material such as aluminum tubing and plate stock. Flat plastic spacer/bushings are provided between the connector plates and the extension arms to preclude metal-on-metal wear. In addition, the inside surface of each facing clamp jaw face is preferably provided with a friction surface such as a layer of ribbed rubber sheet to assist gripping action on the sides of a canister or other container of interest during lifting. Once engaged, of course, the weight of the canister itself generates clamping forces at this stage. Handle grips may be added to the hollow aluminum tubing handles, if desired.

BRIEF DESCRIPTION OF THE DRAWINGS

In the drawings:

FIG. 1 is a perspective view of a container lifting unit in accordance with one embodiment of the present invention;

FIG. 2 is a top view of the container lifting device of FIG. 1;

FIG. 3 is a side elevational view of the container lifting device of FIG. 2;

FIG. 4 is an end elevational view of the container lifting device of FIG. 2.

DETAILED DESCRIPTION

Figure 5A:
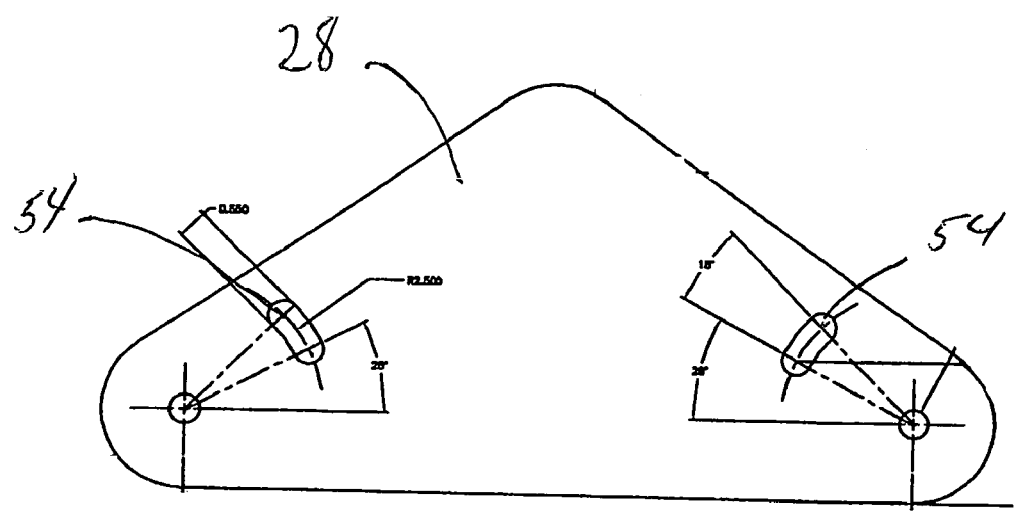
FIGS. 5a and 5b are enlarged top and side views of a connecting link and plastic spacer for the unit of FIGS. 1–4.

The detailed description that follows illustrates a successful embodiment of the inventive concept that is presented by way of example only without any intent to limit the scope of the invention. It is particularly noteworthy that the size, shape and degree of allowable adjustment between open and clamp positions of the lifting unit of the invention can be varied and while the device as shown is particularly well suited to lifting and stacking fiber drums filled with propellant materials, or the like, the device can be adapted in size and shape to provide units to lift containers in a wide variety of sizes and shapes.

FIG. 1 depicts a perspective illustration of one preferred embodiment of a container lifting unit in accordance with the invention which is designed to address cylindrical or drum-shaped containers, possibly propellant-containing drums. The device is designated generally at 10 and can generally be depicted as being two symmetrical opposed half-clamps (or clamp halves) which assembled together form a clamping system to lift the container situated therebetween. The unit includes a pair of arcuate opposed spaced clamp jaw shapes 12, 14, each jaw shape having a gripping width and a pair of generally parallel outer extensions or arm members as at 16, 18, respectively, which diverge at an angle from the jaw shapes, each of the arm members 16, 18 being provided with an opening near the free end thereof as at 20, 22 adapted to receive respective rods or tubes 24, 26 in fixed relation thereto. The tubes extend outward at both ends from the arm openings to form a pair of handles, one on each end.

A pair of generally triangular-shaped connecting link plate members 28, 30 are provided to link respective pairs of jaw extension arm members thereby connecting the two halves of the system together, said arcuate clamp jaw shapes 12, 14 being thereby placed in opposed spaced relation and the handle rods or tubes 24, 26 generally in parallel spaced relation. Each of the connecting link plates 28, 30 is connected to each respective corresponding arm member at two spaced locations. Thus, connecting link plate 28 is connected to arm member 16 as at an outer location 32 and at an inner location 34, preferably using shoulder bolts as shown. Likewise, extension or arm member 18 is fastened to link plate 28 at outer location 36 and inner location 38 in symmetric fashion. In the same manner, connecting link plate 30 is fastened to the remaining arms 16, 18 at outer locations 40, 42 and corresponding respective inner locations 44, 46 using shoulder bolts. Plastic spacer/bushings as at 48 (FIG. 5a) are placed between the arms 16, 18 and the respective corresponding connecting link 28, 30 to provide sliding surfaces for the movement of the parts of the unit. These are the same shape as the connecting links and one is shown at 48 in FIG. 5b.

In addition, the opposed surfaces of clamping jaw shapes 12, 14 are preferably provided with a friction surface such as being lined with a ribbed rubber sheet as at 50 in FIG. 1 to provide a additional gripping action on the sides of the container during lifting. Also, the handle tubes 24, 26 are preferably provided with handle grips as at 52 (which may be similar to bicycle handle-bar grips) for ease of use.

Figure 5B:
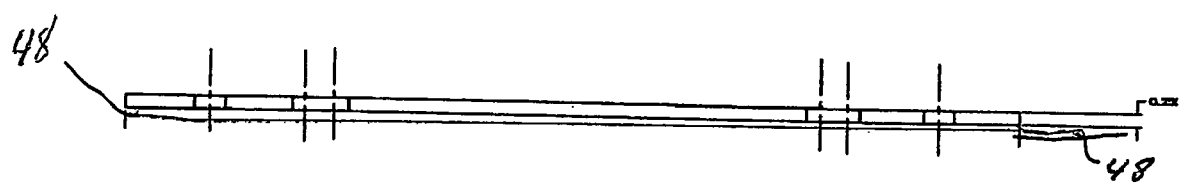

As best seen in the enlarged link member drawing of FIG. 5a, each outer fastening location nearest the free end of each arm is use of a pivot joint which pivots a short distance (using a shoulder bolt as indicated) about which the link plate and the arm member are free to respectively pivot. As particularly illustrated in FIG. 5a, the openings corresponding to the inner connections for the link plates are in the form of curved slots 54 which enable the limited pivoting action between the connecting plates and the clamp jaw arm members which allows, in turn, limited convergence/divergence between the opposed clamp halves. This enables the clamp jaw to be opened slightly to accommodate lids and containers of slightly varying sizes and then rotate into a clamping position to grip the object to be lifted. It will further be noted that a downward motion or force as would be generated by a grabbed or clamped object also forces the clamp jaws toward the closed or grabbing position so that the weight of the object itself provides the grabbing force during lifting and transport; and when the container is placed in the desired position, the handles can readily be rotated outward to release the clamp and allow the unit to slide back over the top of the container that has been moved. Of course, the slotted openings 54 may be any desired shape or length corresponding to a particular embodiment design.

It will occur to those skilled in the art that clamp jaws can be made any desired shape such as rectangular in addition to arcuate shapes and of any diameter and width to address containers of various sizes and shapes. As one skilled in the art will readily appreciate, the unit requires only a few uncomplicated parts and is readily assembled and therefore inexpensive; and it is very efficient. This allows a variety of sizes of the units to be stocked at relatively little cost.

Materials of construction can be anything suitable, however, lightweight metals such as aluminum or high impact plastics are preferred and the plastic spacer/bushings are preferably polyethylene, Teflon (polytetrafluorsethylene) or the like.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

The invention claimed is:

1. A manual lifting device for clamping on and lifting objects, including shaped containers comprising:
    (a) a pair of opposed jaw shapes connected to converge and diverge for capturing and releasing an object, each jaw shape having a pair of spaced jaw extensions;
    (b) a pair of spaced, generally parallel handle rods, each handle rod carrying one of said jaw shapes connected through openings near the ends of said spaced jaw extensions;
    (c) a pair of spaced independent linking plates each linking plate connecting one of said spaced jaw extensions from each of said jaw shapes between said handle rods in a manner that causes said jaw shapes to be disposed in spaced opposed fashion, each presenting a generally, continuously concave surface shaped to generally conform to a partial periphery of a convex-shaped object when the object is captured between said clamping jaw shapes; and
    (d) wherein said linking plates are connected to said jaw extensions in a manner that allows a limited amount of pivotal motion that enables said jaw shapes to converge and diverge relative to each other to thereby close about and grab an object when said handle rods are lifted, and release said object when said handle rods are lowered, such that upon placement over and lifting, an object is captured therebetween and retained by its own weight during lifting.

2. A manual lifting device as in claim 1 wherein rotation of said handle rods pivots said opposed clamping jaw shapes.

3. A manual lifting device as in claim 1 wherein said opposed jaw shapes are arcuate in shape.

4. A manual lifting device as in claim 3 further comprising grip enhancing material on opposed facing surfaces of said jaw shapes.

5. A manual lifting device as in claim 4 wherein said grip enhancing material is ribbed rubber.

6. A manual lifting device as in claim 3 wherein said object to be lifted is generally cylindrical in shape.

7. A manual lifting device as in claim 1 further comprising grip enhancing material on opposed facing surfaces of said jaw shapes.

8. A manual lifting device as in claim 7 wherein said grip enhancing material is ribbed rubber.

9. A manual lifting device as in claim 1 wherein said opposed clamping jaw shapes, handle rods and linking plates comprise aluminum.

10. A manual lifting device for grasping and lifting objects, including shaped containers comprising:
   (a) a pair of opposed jaw shapes connected to converge and diverge for grasping and releasing an object, each jaw shape having a pair of spaced jaw extensions;
   (b) a pair of spaced, generally parallel handle rods, each handle rod carrying one of said jaw shapes connected through openings near the ends of said spaced jaw extensions;
   (c) a pair of spaced independent linking plates each linking plate connecting one of said spaced jaw extensions from each of said jaw shapes between said handle rods in a manner that causes said jaw shapes to be disposed in spaced opposed fashion, each describing a partial periphery generally in the shape of an object to be lifted, wherein said linking plates further include shaped slots to provide for selective pivotal motion of said opposed jaw shapes; and
   (d) wherein said linking plates are connected to said jaw extensions in a manner that allows a limited amount of pivotal motion that enables said jaw shapes to converge and diverge relative to each other to thereby close about and grasp an object when said handle rods are lifted, and release said object when said handle rods are lowered, such that upon placement over and lifting, an object is captured therebetween and retained by its own weight during lifting.

11. A manual lifting device as in claim 10 wherein said opposed jaw shapes are arcuate and present a concave surface to an object to be lifted.

12. A manual lifting device as in claim 11 wherein said device is designed to lift an object that is generally cylindrical in shape.

13. A manual lifting device as in claim 10 further comprising grip enhancing material on facing surfaces of said opposed jaw shapes.

14. A manual lifting device as in claim 13 wherein said grip enhancing material is ribbed rubber.

15. A manual lifting device as in claim 10 wherein said opposed jaw shapes, handle rods and linking plates comprise aluminum.

* * * * *